(12) United States Patent
Tsuchiya (10) Patent No.: US 8,352,123 B2
(45) Date of Patent: Jan. 8, 2013

(54) CONTROL DEVICE OF ELECTRIC POWER STEERING DEVICE FOR VEHICLES IN WHICH STEERED WHEELS ARE DRIVEN

(75) Inventor: Yoshiaki Tsuchiya, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1132 days.

(21) Appl. No.: 11/664,697

(22) PCT Filed: Oct. 11, 2005

(86) PCT No.: PCT/JP2005/018994
§ 371 (c)(1),
(2), (4) Date: Apr. 5, 2007

(87) PCT Pub. No.: WO2006/041177
PCT Pub. Date: Apr. 20, 2006

(65) Prior Publication Data
US 2007/0265751 A1    Nov. 15, 2007

(30) Foreign Application Priority Data
Oct. 14, 2004  (JP) ................................ 2004-299755

(51) Int. Cl.
*B62D 6/00* (2006.01)
(52) U.S. Cl. .............. 701/41; 701/36; 701/42; 180/204; 180/6.2; 180/6.24; 180/6.44; 180/252
(58) Field of Classification Search .................... 701/36, 701/41–44
See application file for complete search history.

(56) References Cited

U.S. PATENT DOCUMENTS

| | | | | |
|---|---|---|---|---|
| 5,076,381 A * | 12/1991 | Daido et al. | .................. | 180/446 |
| 5,198,981 A * | 3/1993 | Collier-Hallman et al. | .... | 701/42 |
| 5,257,828 A * | 11/1993 | Miller et al. | .................. | 180/446 |
| 5,259,473 A * | 11/1993 | Nishimoto | .................... | 180/446 |
| 5,508,919 A * | 4/1996 | Suzuki et al. | ................... | 701/41 |
| 5,740,040 A * | 4/1998 | Kifuku et al. | ................... | 701/41 |
| 5,788,010 A * | 8/1998 | Mukai et al. | .................. | 180/446 |
| 5,845,222 A | 12/1998 | Yamamoto et al. | | |
| 5,894,205 A * | 4/1999 | Shimizu et al. | ............... | 318/432 |
| 5,984,042 A * | 11/1999 | Nishimoto et al. | ........... | 180/446 |
| 6,015,023 A * | 1/2000 | Mukai et al. | .................. | 180/446 |
| 6,032,755 A * | 3/2000 | Blandino et al. | .............. | 180/446 |

(Continued)

FOREIGN PATENT DOCUMENTS
DE    1 980 1982    2/1999
(Continued)

*Primary Examiner* — Jonathan M Dager
(74) *Attorney, Agent, or Firm* — Oliff & Berridge, PLC (57) ABSTRACT

When the steered wheels are driven, there is a problem of the torque steering that the steering is disturbed by the difference in the driving forces between a pair of left and right steered wheels. Before such a problem, there is a problem that, since the vehicle is apt to run straight ahead more strongly as the driving force increases even when a uniform driving torque is given to a pair of steered wheels, a larger force is required to steer the vehicle leftward or rightward by overcoming such a tendency of running straight ahead. In view of the above, the steering assist force is increased according to an increase of the driving torque of the steered wheels in a manner of harmonizing the steering assist force to the magnitude of the steering resistance due to the driving torque of the steered wheels, so as to improve the steering feeling.

8 Claims, 6 Drawing Sheets

U.S. PATENT DOCUMENTS

| | | | |
|---|---|---|---|
| 6,070,692 A | 6/2000 | Nishino et al. | |
| 6,079,513 A * | 6/2000 | Nishizaki et al. | 180/402 |
| 6,102,151 A * | 8/2000 | Shimizu et al. | 180/446 |
| 6,112,845 A * | 9/2000 | Oyama et al. | 180/443 |
| 6,184,637 B1 * | 2/2001 | Yamawaki et al. | 318/432 |
| 6,226,580 B1 * | 5/2001 | Noro et al. | 701/42 |
| 6,262,547 B1 | 7/2001 | Kifuku et al. | |
| 6,450,287 B1 * | 9/2002 | Kurishige et al. | 180/446 |
| 6,505,702 B1 * | 1/2003 | Shinmura et al. | 180/446 |
| 6,687,589 B2 * | 2/2004 | Kanda | 701/41 |
| 6,883,637 B2 * | 4/2005 | Nishizaki et al. | 180/446 |
| 6,942,057 B2 * | 9/2005 | Boloorchi et al. | 180/446 |
| 7,073,621 B2 * | 7/2006 | Koibuchi et al. | 180/421 |
| 7,177,745 B2 * | 2/2007 | Tsuchiya | 701/41 |
| 2001/0017229 A1 * | 8/2001 | Kada et al. | 180/446 |
| 2002/0026267 A1 * | 2/2002 | Kifuku | 701/41 |
| 2002/0060538 A1 * | 5/2002 | Hara et al. | 318/432 |
| 2003/0146041 A1 * | 8/2003 | Kanda | 180/446 |
| 2004/0148078 A1 * | 7/2004 | Nakano et al. | 701/41 |
| 2004/0238238 A1 | 12/2004 | Yokote | |
| 2005/0121252 A1 * | 6/2005 | Tsuchiya | 180/446 |
| 2006/0069481 A1 * | 3/2006 | Kubota et al. | 701/41 |

FOREIGN PATENT DOCUMENTS

| | | |
|---|---|---|
| EP | 1 800 995 A1 | 6/2007 |
| JP | A-4-108077 | 4/1992 |
| JP | A-6-263050 | 9/1994 |
| JP | A 8-104249 | 4/1996 |
| JP | A 9-207802 | 8/1997 |
| JP | A 10-218001 | 8/1998 |
| JP | A 11-263233 | 9/1999 |
| JP | A 2001-80535 | 3/2001 |
| JP | A 2001-171533 | 6/2001 |
| JP | A 2003-63436 | 3/2003 |
| JP | A-2004-196069 | 7/2004 |
| WO | WO 01/077812 | 10/2001 |

* cited by examiner

CONTROL DEVICE OF ELECTRIC POWER STEERING DEVICE FOR VEHICLES IN WHICH STEERED WHEELS ARE DRIVEN

FIELD OF THE INVENTION

The present invention relates to a control device of an electric power steering device for vehicles in which the steered wheels are driven.

BACKGROUND OF THE INVENTION

As a powering device of a power steering to assist the steering by operation of the steering wheel by the driver by an external power, there is known an electric power steering device using an electric motor. Since the electric power steering device using an electric motor can freely control the magnitude of the steering assist force independently of the steering angle or the steering angular velocity, it is tried in various manners to control the operation of the electric power steering device in relation with the operating conditions of the vehicle. As one of them it is proposed in Japanese Patent Laid-open Publication Hei 8-104249 to incorporate a reaction component based upon a detected value of the behavior of the vehicle including the yaw rate in the driving instructions to the electric motor, while detecting the driving force of the steered wheels, and to modify the parameter gain of the reaction component based upon the detected driving force.

DISCLOSURE OF THE INVENTION

When the steered wheels are driven, there is a problem of the torque steering that the steering is disturbed by the difference in the driving forces between a pair of left and right steered wheels. Further, before such a problem, there is a problem that, since the vehicle is apt to run straight ahead more strongly when the driving force increases even when a uniform driving torque is given to a pair of steered wheels, a larger force is required to steer the vehicle leftward or rightward by overcoming such a tendency of running straight ahead.

In view of the abovementioned problems, it is the principal object of the present invention to improve the steer feeling of the vehicle equipped with an electric power steering device capable of controlling the steering assist force without being affected by the steering angle or the steering angular velocity.

Moreover, it is a further object of the present invention to improve the steer feeling in the reversal steering by applying an operation control referring to the abovementioned matters related with the driving force of the steered wheels to the electric power steering device also in the reversal steering.

It is a still further object of the present invention to prevent the steering being overshot when the steering assist torque is increased to improve the steer feeding for the abovementioned objects According to the present invention, the abovementioned principal object is accomplished by a control device of an electric power steering device for vehicles comprising a steering wheel, a pair of steered wheels adapted to be steered by the steering wheel, and a power source for driving the steered wheels, characterized by comprising a calculating device which calculates a target value of a steering assist force to be generated by the electric power steering device so as to be increased according to an increase of the steering torque of the steering wheel with an increase which increases according to an increase of the driving torque of the steered wheels when driving force of the steered wheels is higher than a value which affects steer feeling.

By the electric power steering device being controlled by calculating a target value of a steering assist force to be generated by the electric power steering device so as to be increased according to an increase of the steering torque of the steering wheel with an increase which increases according to an increase of the driving torque of the steered wheels when driving force of the steered wheels is higher than a value which affects steer feeling as described above, the steering assist force generated by the electric power steering device is controlled to increase according to an increase of the steering torque of the steering wheel with an increase by taking an increase of the force resisting the steering according to an increase of the driving torque of the steered wheels into consideration, so that the driving force of the steered wheels does not affect the steer feeling and the steer feeling of the steering wheel is stabilized regardless of the changes of the driving torque of the steered driven wheels.

In the control device as described above, the calculating device may be so adapted as to increase the target value of the steering assist force according to an increase of a time-based differential of steering angle of the steering wheel. When the target value of the steering assist force is increased according to an increase of a time-based differential of steering angle of the steering wheel, the target value for the steering assist force is more appropriately adapted to the steering resistance which increases according to an increase of the time-based differential of the steering angle of the steering wheel.

Moreover, the calculating device may further be so adapted as to calculate a target value of the steering assist force for reversal steering which increases according to an increase of the driving torque of the steered wheels when the steering wheel is returned toward the central position. By such a control the steer feeling in the reversal steering is also improved.

In this case, the target value of the steering assist torque for reversal steering may be decreased according to an increase of vehicle speed. By such an arrangement, it is prevented that the reversal steering becomes excessive by the steering assist force for reversal steering when the vehicle is running at a speed higher than a certain speed, while restricting the steering assist in reversal steering to a very low speed running of the vehicle In this case, the target value of the steering assist torque for reversal steering may be made to be the largest when the steering angle of the steering wheel is medium. By such an arrangement, the reversal steering assist force is conformed to the need of reversal steering force which changes according to the steering angle of the steering wheel.

Moreover, the target value of the steering assist force may be decreased according to an increase of a time-based differential of the steering angle of the steering wheel by a rate which increases according to an increase of vehicle speed. Such a control provides a damping effect to the steering device according to the change rate of the steering angle so that the power assist steering does not go too far by decreasing the steering assist force according to an increase of the time-based differential of the steering angle particularly in a high-speed running without conflicting with the control of increasing the target steering assist force according to an increase of the time-based differential of the steering angle of the steering wheel by the vehicle speed area in which the target value of the steering assist force is decreased according to an increase of the time-based differential of the steering angle of the steering wheel being positioned on a higher vehicle speed side of the vehicle speed area in which the target value of the steering assist force is increased according to an increase of the time-based differential of the steering angle of the steering wheel.

Moreover, the calculating device may be so adapted as to decrease the target value of the steering assist force according to an increase of vehicle speed. By such an arrangement, the steering assist force is more appropriately adapted to the vehicle speed.

BEST MODE EMBODIMENTS OF THE INVENTION

In the following, the present invention will be described in more detail with respect to its preferred embodiment by referring to the accompanying drawing.

Figure 1:
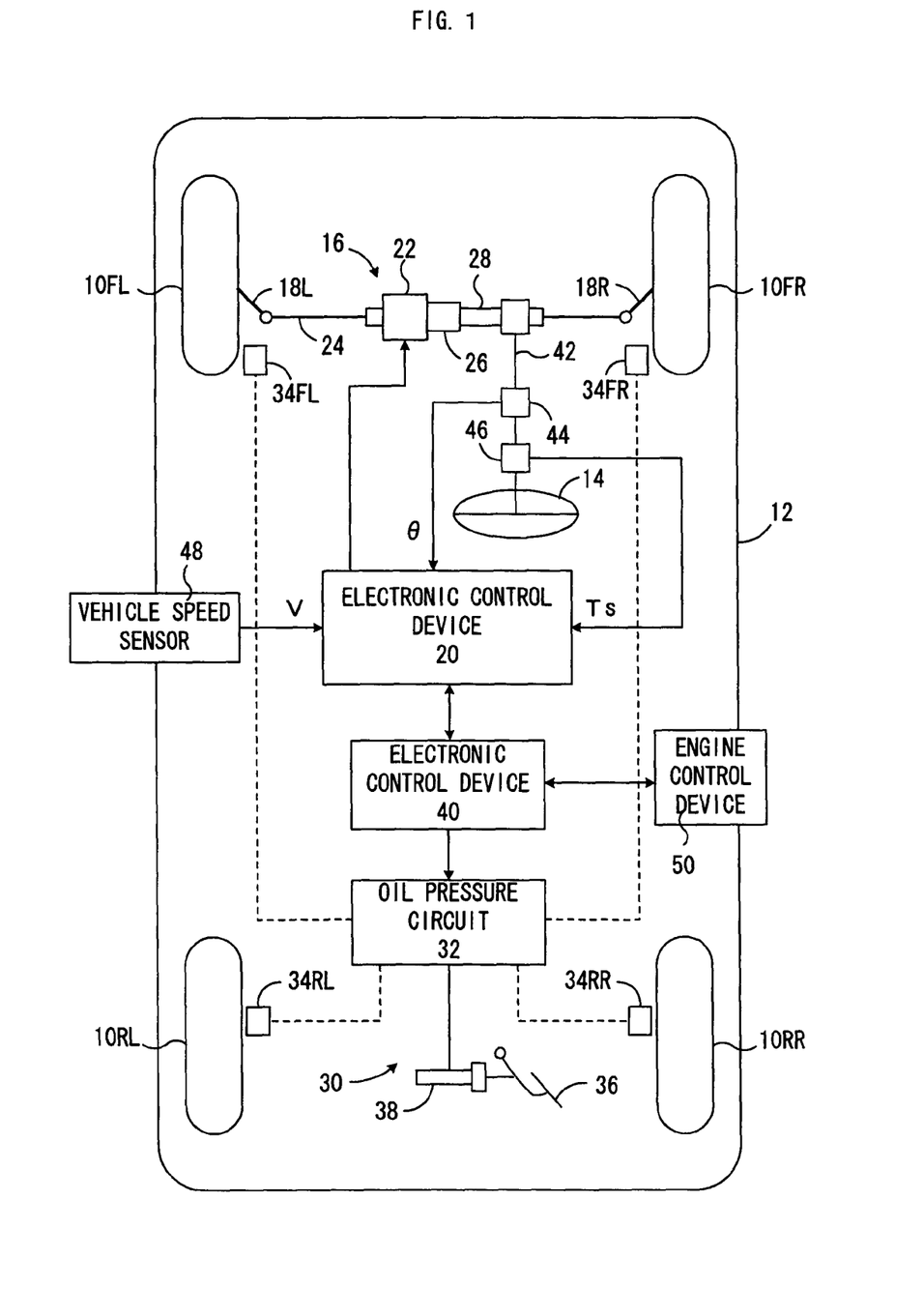
FIG. 1 is a diagrammatical view of a vehicle showing the constructional components thereof concerned with the control device according to the present invention.

In FIG. 1, 10FL, 10FR, 10RL and 10RR are front left, front right, rear left and rear right wheels mounted to a vehicle body 12 by the suspension devices not shown in the figure, in which the front left wheel 10FL and the front right wheel 10FR are the steered wheels adapted to be steered by the steering wheel 14 operated by the driver and an electric power steering device generally designated by 16, by way of tie rods 18L and 18R, respectively. 20 is an electronic control device incorporating a microcomputer.

The electric power steering device 16 has an electric motor 22 which drives a rack bar 24 by way of a movement conversion device 26 made of balls and a screw so as to turn the steered wheels 10FL and 10FR about the king pins not shown in the figure by the tie rods 18L and 18R pivotably mounted at opposite ends of the rack bar 24. In the shown embodiment, the steered front wheels 10FL and 10FR are adapted to be driven by a power source made of a conventional engine or a hybrid power source made of a combination of an engine and one or two electric motors.

30 is a braking device which incorporates an oil pressure circuit 32 not shown in detail in the figure but well-known in this art, and although not shown in detail in the figure as it is a well-known art, it is so constructed that a braking: oil pressure is selectively supplied to wheels cylinders 34FL, 34FR, 34RL and 34 RR to exert braking forces to brake discs incorporated. in the wheels 10FL, 10FR, 10RL and 10RR. The oil pressure circuit 32 is connected with a manual braking device including a brake pedal 36 and a master cylinder 38 also well-known in this art. 40 is an auxiliary electronic control device for executing the stabilizing control of the vehicle by automatically controlling the oil pressure circuit 32 in various manners known in this act.

42 is a steering shaft to manually drive the rack bar 24 by way of a pinion not shown in the figure by being rotated according to the steering operation of the driver. 44 is a steering angle sensor to dispatch a signal indicating the steering angle θ to the electronic control device 20 by detecting the steering of angle of the steering shaft 42. 46 is a toque sensor to dispatch a signal indicating the steering torque Ts transmitted through the steering shaft 42 to the electronic control device 20 by detecting it. 48 is a vehicle speed sensors to dispatch a signal indicating vehicle speed V to the electronic control device 20 by detecting it in a manner known in this art. 50 is an engine control device to conduct the traction control in a manner known in this art.

The operation of the control device for the electric power steering device 16 according to the present invention is substantially executed according to a control program stored in the electronic control device 20 according to the present invention. An embodiment of the control will be described hereinbelow by referring to FIGS. 2-13.

Figure 2:
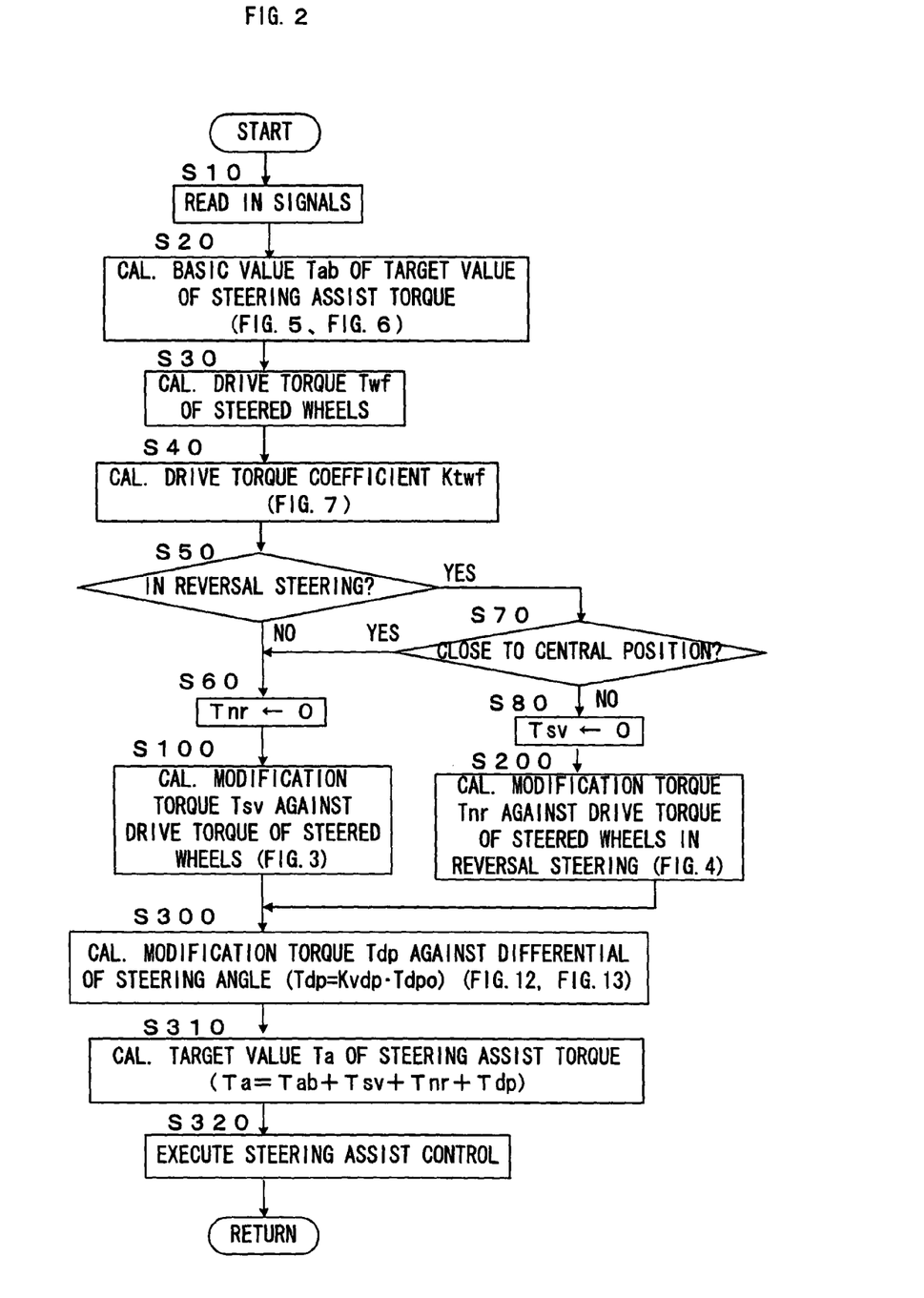
FIG. 2 a flowchart showing the main routine of the operation of the control device according to the present invention.

FIG. 2 is a flowchart showing the main routine of the abovementioned control. The control along this main routine is cyclically conducted at a cycle of 10-100 milliseconds throughout the operation of the vehicle when the ignition switch was closed.

When the control is started, in step 10 the signals from the steering angle sensor 44, the steering torque sensor 46, the vehicle speed sensor 48 and other various sensors not shown in the figure are read in.

Figure 5:
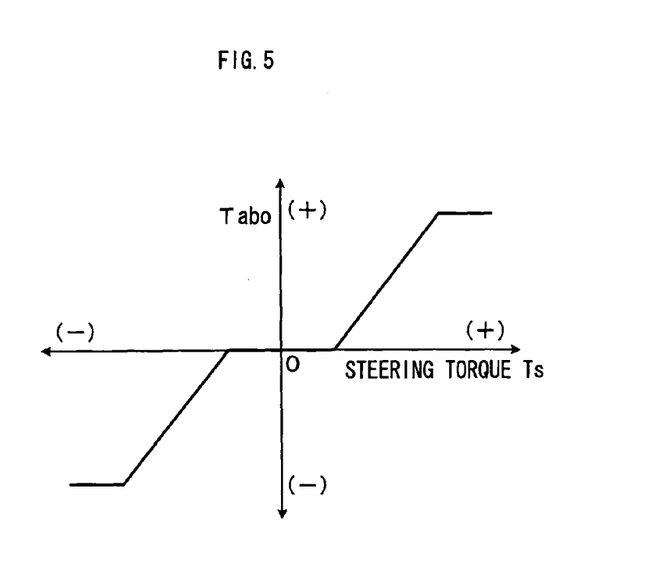
FIG. 5 is a map showing the base value Tabo for the target value of the steering assist torque based upon the steering torque Ts.
Figure 6:
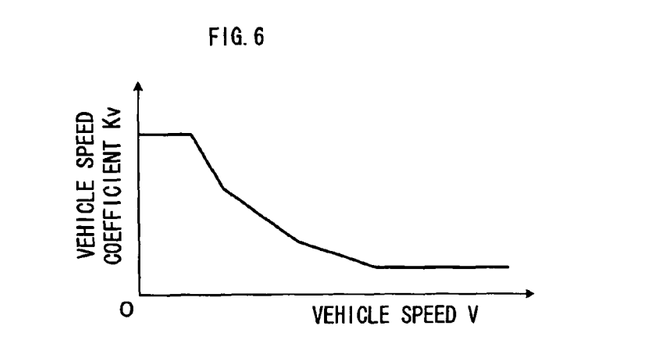
FIG. 6 is a map showing the vehicle speed coefficient Kv for modifying Tabo against the vehicle speed.

Then, in step 20, a basic value for the target steering assist force to be generated by the electric power steering device is calculated based upon the steering torque of the steering wheel and the vehicle speed. In the shown embodiment, the steering assist force is expressed in the steering assist torque, the basic value of which is obtained as a value Tab of the target steering assist torque by looking at maps such as shown in FIGS. 5 and 6. In more detail, a base value Tabo for the basic value Tab for the target steering assist torque is calculated based upon the steering torque Ts of the steering wheel by looking at a map such as shown in FIG. 5 so that Tabo increases according to an increase of Ts. Herein the values for the left turn and the right turn are made positive and negative, respectively. On the other hand, a vehicle speed coefficient Kv is obtained by looking at a map such as shown in FIG. 6 based upon the vehicle speed V so that Kv decreases according to an increase of V. Then, the basic value Tab for the target steering assist torque is calculated as Tab=Kv·Tabo.

In step 30, the driving torque Twf of the front wheels is calculated. This can be calculated based upon the output of the power source and the reduction ratio of the driving system.

Figure 7:
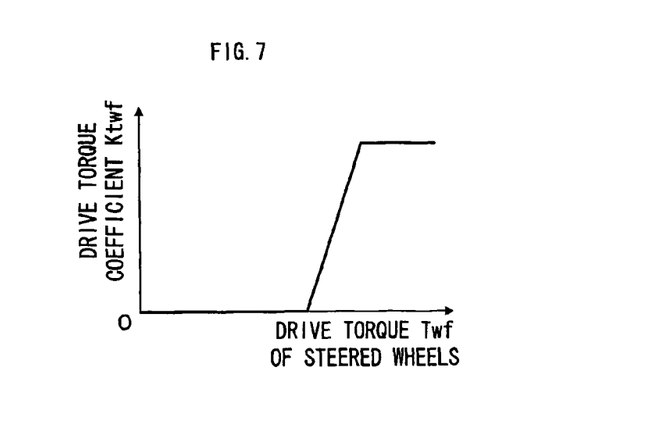
FIG. 7 is a map showing the drive torque coefficient Ktwf for modifying the below-mentioned modification torque Tsv and the base value of Tnr against the drive torque Twf of the steered wheels.

Then the control proceeds to step 40, and the driving torque coefficient Ktwf for reflecting the effect of the driving torque of the steered wheels on modifying the target value of the steering assist torque is calculated based upon the driving torque Twf of the steered wheels by looking at a map such as shown in FIG. 7 so that Ktwf increases according to an increase of Twf when driving force of the steered wheels is higher than a value which affects steer feeling.

Then the control proceeds to step 50, and it is judged if the steering is being reversed or not. When the answer is no, the control proceeds to step 60, and a modification torque Tnr for the steered wheel driving torque in the reversal steering is reset to 0. On the other hand, when the answer of step 50 is yes, the control proceeds to step 70, and it is judged if the steering condition is in a certain narrow range around the central position or not. When the answer of step 70 is no, i.e., when the reversal steering is being made at a relatively large angle, the control proceeds to step 80, and a modification torque Tsv for the steered wheel driving torque in the not reversal steering is reset to 0.

Figure 3:
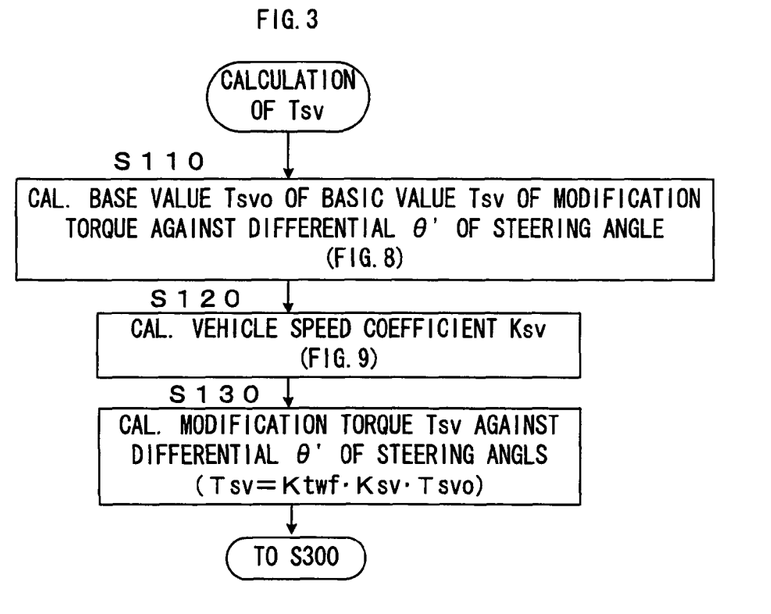
FIG. 3 is a flowchart of a subroutine for calculating the modification torque Tsv against the steering angular velocity, the vehicle speed and the driving torque of the steered wheels conducted in step 100 of the main routine.

The control proceeds from step 60 to step 100, and the modification value Tsv for the steering assist torque for the steered wheel driving torque is calculated according to the flowchart of the subroutine shown in FIG. 3.

Figure 8:
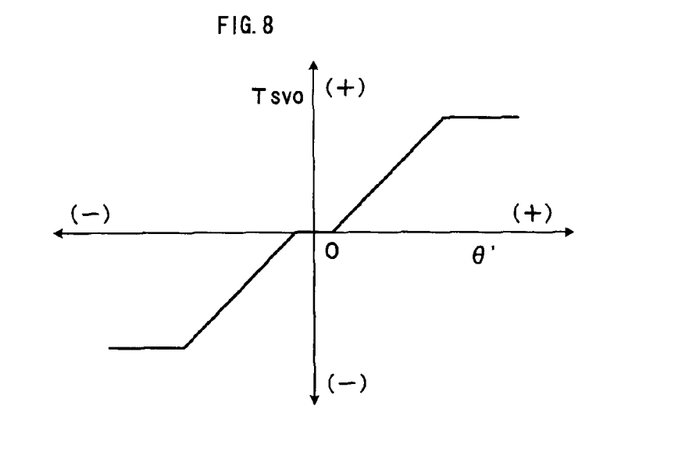
FIG. 8 is a map showing the base value Tsvo of the modification torque Tsv based upon the time-based differential θ' of the steering angle.

Here temporarily referring to FIG. 3, in step 110, a base value Tsvo for the steering torque modification value Tsv is calculated based upon the time-based differential $\theta'$ of the steering angle $\theta$ by looking at a map such as shown in FIG. 8 so that Tsvo increases according to an increase of $\theta'$. In this case, it is also so ruled that the values for the left turn and the right turn are expressed as positive nad negative, respectively.

Figure 9:
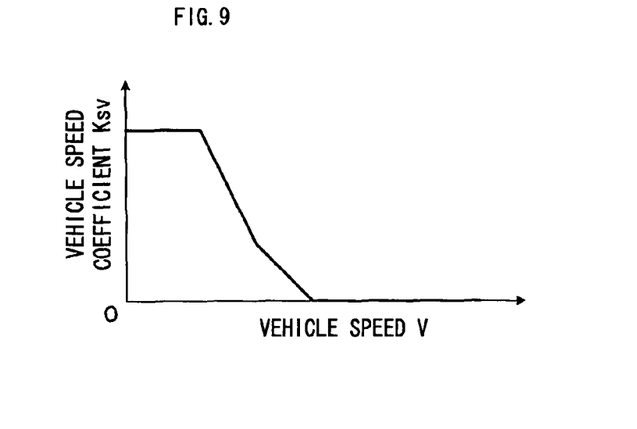
FIG. 9 is a map showing the vehicle speed coefficient Ksv for modifying Tsvo against the vehicle speed V.

Then the control proceeds to step 120, and a vehicle speed coefficient Ksv for modifying the base value Tsvo against the vehicle speed is calculated based upon the vehicle speed V by looking at a map such as shown in FIG. 9 so that Ksv decreases according to an increase of V. As is understood from FIG. 9, Ksv is a coefficient which becomes 0 when the vehicle speed increases above a certain speed.

Then the control proceeds to step 130, and the modification torque Tsv based upon the driving torque of the steered wheels is calculated by using Tsvo and Ksv calculated in the above and the driving torque coefficient Ktwf calculated in step 40 such as Tsv=Ktwf·Ksv·Tsvo. Then the control returns to the main routine to proceed to step 300.

Figure 4:
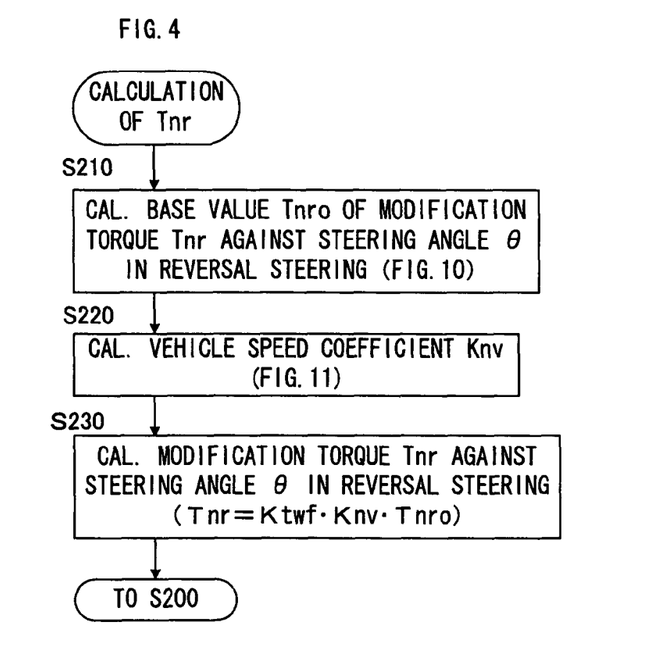
FIG. 4 is a flowchart of the subroutine for calculating the modification torque Tnr against the reversal steering angle, the vehicle speed and the driving torque of the steered wheels conducted in step 200 of the main routine.

On the other hand, when the steering is being reversed in a range apart from the central position more than a determined angle, so that the answer of step 50 is yes and the answer of step 70 is no, the control proceeds to step 200 through the abovementioned step 80, and a modification torque Tar in the reversal steering is calculated according to a subroutine such as shown in FIG. 4.

Figure 10:
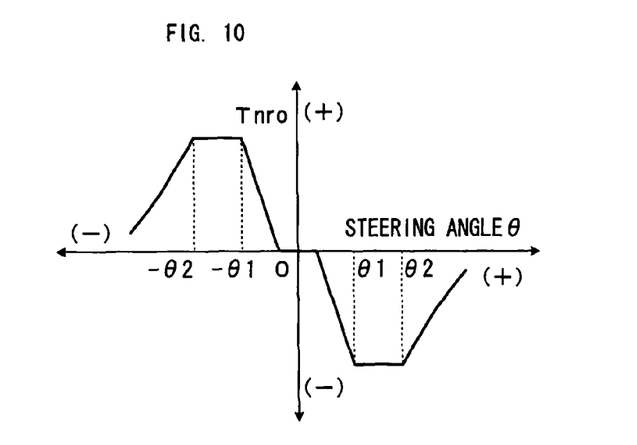
FIG. 10 is a map showing the base value Tnro of the modification torque Tnr in the reversal steering based upon the steering angle θ.

Here referring to the flowchart of FIG. 4, in step 210, a base value Tnro for the modification torque Tnr in the reversal steering is calculated based upon the steering angle $\theta$ by looking at a map such as shown in FIG. 10 so that Tnro increases in the absolute value of a negative value according to an increase of $\theta$ when $\theta$ increases up to a medium value and decreases in the absolute value of an negative value when the steering angle increases more. In this case, it is also so ruled that the values for the left turn and the right turn are made positive and negative, respectively. Tnro is a torque acting in the reverse direction in the reversal steering.

Figure 11:
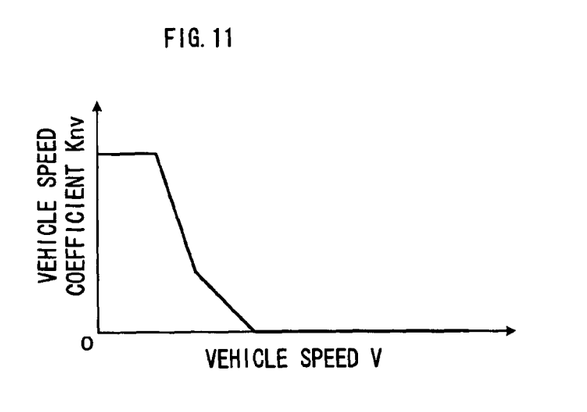
FIG. 11 is a map showing the vehicle speed coefficient Knv for modifying Tnro against the vehicle speed V.

Then the control proceeds to step 220, and a vehicle speed coefficient Knv for modifying Tnro against the vehicle speed is calculated based upon the vehicle speed V by looking at a map such as shown in FIG. 11 so that Knv decreases according to an increase of V.

Then in step 230 the modification torque Tnr in the reversal steering is calculated by using Tnro and Knv calculated in the above and Ktwf calculated in step 40 such as Tnr=Ktwf·Knv·Tnro. Then the control returns to the main routine to proceed to step 300.

Figure 12:
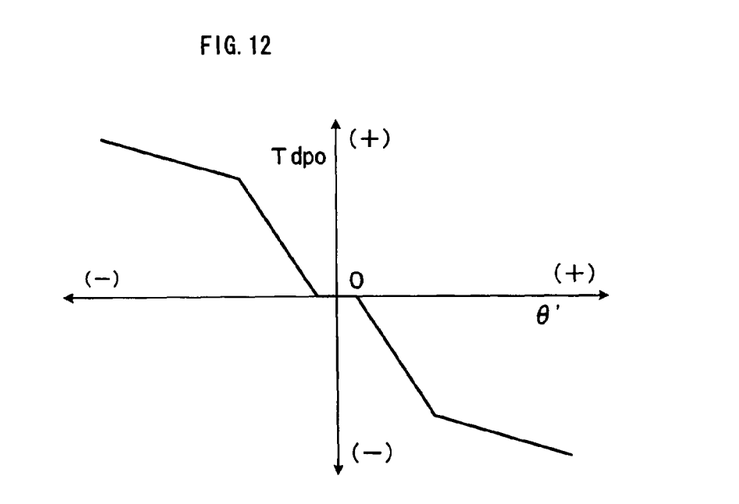
FIG. 12 is a map showing the base value Tdpo of the modification torque Tdp based upon the time-based differential θ' of the steering angle.
Figure 13:
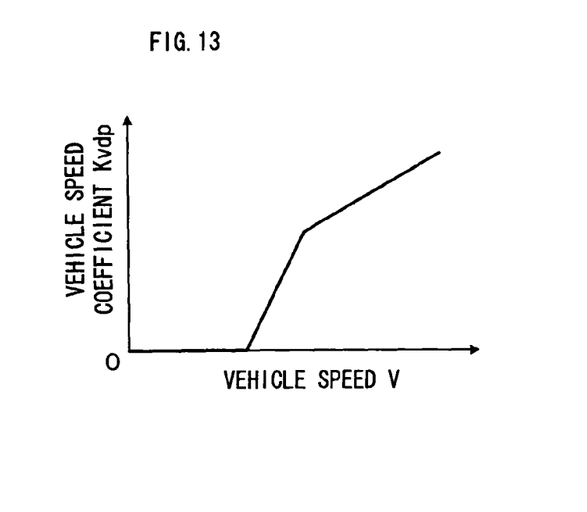
FIG. 13 is a map showing the vehicle speed coefficient Kvdp for modifying Tdpo against the vehicle speed V.

In step 300, a base value Tdpo of the modification torque Tdp based upon the time-based differential $\theta'$ of the steering angle $\theta$ is calculated by looking at a map such as shown in FIG. 12 so that Tdpo increases in the absolute value of a negative value according to an increase of $\theta'$, while a vehicle speed coefficient Kvdp for modifying the base value Tdpo is calculated by looking at a map such as shown in FIG. 13 so that Kvdp increases according to an increase of V, and the modification torque Tdp based upon the time-based differential of the steering angle is calculated by multiplying these values such as Tdp=Kvdp·Tdpo. In this case, also in FIG. 12, the values for the left turn and the right turn are expressed as positive and negative, respectively.

As is understood from FIG. 12, the modification torque Tdp according to the time-based differential $\theta'$ of the steering angle $\theta$ increases in the absolute value of a negative value according to an increase of the time-based differential $\theta'$ of the steering angle $\theta$, so that thereby a damping effect according to the changing rate of the steering angle $\theta$ is given to the steering device not to go too far in the power steering. This damping effect is increased according to an increase of the vehicle speed. Moreover, as will be understood from the comparison of FIG. 9 and FIG. 13, the vehicle speed areas in which Tsv acts effectively and Tdp acts effectively are different from each other so that the modification torque Tsv which increases according to an increase of the driving torque Twf of the steered wheels and the time-based differential $\theta'$ of the steering angle acts in a low vehicle speed area, while Tdp which gives the damping effect to the power steering according to an increase of the changing rate of the steering angle acts in a high vehicle speed area.

Then the control proceeds to step 310, and a target value Ta of the steering assist torque is calculated as the sum of Tab, Tsv, Tnr and Tdp, i,e, Ta=Tab+Tsv+Tnr+Tdp. This is to increase the basic value Tab for the target value of the steering assist torque calculated based upon the maps of FIG. 5 and FIG. 6 as much as the torque Tsv calculated by the subroutine of FIG. 3 when the steering angle is increased, while applying a reversal steering assist torque to modify the basic value Tab in the negative direction by the absolute value of the torque Tnr calculated by the subroutine of FIG. 4 in the reversal steering, and in both cases to dampen the basic value Tab by the torque Tdp which increases in the absolute value of a negative value according to an increase of the time-based differential $\theta'$ of the steering angle in a high vehicle speed area. Although the modification of the target value of the steering assist torque by the modification torques Tsv, Tnr and Tdp is done by the summing in the shown embodiment, the modification by these modification torques may be made in a multiplying manner by converting the values of Tsv, Tnr and Tdp into appropriate coefficients to be multiplied.

Then, finally, in step 320 the steering assist control is executed based upon the target value Ta of the steering assist torque calculated in the abovementioned manner.

Although the present invention has been described in detail with respect to an embodiment thereof, it will be apparent for those skilled in the art that various modifications are possible within the scope of the present invention.

The invention claimed is:

1. A control device of an electric power steering device for vehicles comprising:
    a steering wheel,
    a pair of steered wheels arranged to be steered by the steering wheel,
    a power source for driving the steered wheels in rotation to drive the vehicle, and
    a calculating device configured to calculate a target value of a steering assist force to be generated by the electric power steering device so as to be increased according to an increase of a steering torque of the steering wheel by a rate which increases according to an increase of a driving torque of the steered wheels by the power source.

2. A control device according to claim 1, wherein the calculating device is configured to increase the increase of the target value of the steering assist force according to an increase of the driving torque of the steered wheels by a rate which increases according to an increase of a time-based differential of steering angle of the steering wheel.

3. A control device according to claim 1, wherein the calculating device is configured to calculate a target value of the steering assist force for reversal steering which increases according to an increase of the driving torque of the steered wheels, the steering assist force for reversal steering being applied in a direction of reversal steering.

4. A control device according to claim 3, wherein the calculating device is configured to decrease the target value of the steering assist torque for reversal steering according to an increase of vehicle speed.

5. A control device according to claim 4, wherein the calculating device is configured to make the target value of the steering assist torque for reversal steering to be largest when the steering angle of the steering wheel is substantially in a middle position between a neutral position and a maximum position.

6. A control device according to claim 1, wherein the calculating device is configured to decrease the target value of the steering assist force according to an increase of a time-based differential of the steering angle of the steering wheel by a rate which increases according to an increase of vehicle speed.

7. A control device according to claim 1, wherein the calculating device is configured to decrease the target value of the steering assist force according to an increase of vehicle speed.

8. A control device according to claim 3, wherein the calculating device is configured to decrease the target value of the steering assist force for reversal steering according to an increase of vehicle speed.

* * * * *